(12) United States Patent
Watanabe

(10) Patent No.: US 10,094,993 B2
(45) Date of Patent: Oct. 9, 2018

(54) CONNECTOR AND CONNECTOR SET WITH ASYMMETRIC COUPLED SURFACES

(71) Applicant: MURATA MANUFACTURING CO., LTD., Kyoto-fu (JP)

(72) Inventor: Ryo Watanabe, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 15/659,082

(22) Filed: Jul. 25, 2017

(65) Prior Publication Data

US 2017/0357065 A1    Dec. 14, 2017

Related U.S. Application Data

(63) Continuation of application No. PCT/JP2015/079658, filed on Oct. 21, 2015.

(30) Foreign Application Priority Data

Jan. 30, 2015    (JP) .................................. 2015-017438

(51) Int. Cl.
G02B 6/42    (2006.01)
G02B 6/38    (2006.01)

(52) U.S. Cl.
CPC ......... *G02B 6/4255* (2013.01); *G02B 6/3865* (2013.01); *G02B 6/423* (2013.01); *G02B 6/4206* (2013.01); *G02B 6/428* (2013.01); *G02B 6/4214* (2013.01); *G02B 6/4292* (2013.01); *G02B 6/3885* (2013.01)

(58) Field of Classification Search
CPC .. G02B 6/4255; G02B 6/3865; G02B 6/4206; G02B 6/4292; G02B 6/428; G02B 6/423; G02B 6/4214
See application file for complete search history.

(56) References Cited

U.S. PATENT DOCUMENTS 6,520,686 B1    2/2003 Kiani
2010/0014815 A1*    1/2010 Ohmura ............... G02B 6/3846
                                                      385/83

FOREIGN PATENT DOCUMENTS

| JP | H11-287926 A | 10/1999 |
| JP | 2008-015348 A | 1/2008 |
| JP | 2012-068535 A | 4/2012 |
| JP | 2013-137465 A | 7/2013 |
| WO | 2014/030567 A1 | 2/2014 |

OTHER PUBLICATIONS

International Search Report issued in PCT/JP2015/079658; dated Jan. 19, 2016.
Written Opinion issued in PCT/JP2015/079658; dated Jan. 19, 2016.

* cited by examiner

*Primary Examiner* — Akm E Ullah
(74) *Attorney, Agent, or Firm* — Studebaker & Brackett PC

(57) ABSTRACT

A connector and a connector set that can be fabricated by using a mold including a smaller number of components.

15 Claims, 10 Drawing Sheets

CONNECTOR AND CONNECTOR SET WITH ASYMMETRIC COUPLED SURFACES

CROSS REFERENCE TO RELATED APPLICATIONS

This application claims benefit of priority to Japanese Patent Application 2015-017438 filed Jan. 30, 2015, and to International Patent Application No. PCT/JP2015/079658 filed Oct. 21, 2015, the entire content of which is incorporated herein by reference.

TECHNICAL FIELD

The present disclosure relates to a connector and a connector set. More particularly, the present invention relates a connector and a connector set that optically couple an optical fiber and a light emitting element or a light receiving element to each other.

BACKGROUND

As a disclosure relating to a related-art connector, for example, an optical module described in Japanese Unexamined Patent Application Publication No. 2013-137465 is known. This optical module includes a connector component, a lens array component, a reflective film, light receiving/emitting element, and a circuit board. The light receiving/emitting element is mounted on the circuit board. The lens array component is attached onto the circuit board so as to cover the light receiving/emitting element. A projection projecting rightward is provided on a right surface of the lens array component. The connector component is provided at a distal end of an optical fiber and engaged with the projection so as to be attached to the lens array component. That is, the projection is a positioning member that is used to position the connector component and the lens array component. The reflective film is provided in the lens array component so as to optically couple the optical fiber and the light receiving/emitting element to each other. Furthermore, a lens is provided on a surface of the lens array component facing the light receiving/emitting element.

At least three components of a mold are required to fabricate the lens array component of the optical module described in Japanese Unexamined Patent Application Publication No. 2013-137465. In more detail, as illustrated in, for example, FIG. 6 of Japanese Unexamined Patent Application Publication No. 2013-137465, the positioning portion is a cylindrical member projecting from the right surface of the lens array component. Furthermore, the lens is provided on a lower surface of the lens array component. Accordingly, in order to form the lower surface including the lens, a first component of the mold on the lower side is required. Furthermore, in order to form an upper surface, a second component of the mold on the upper side is required. Furthermore, the positioning portion is a projection projecting from the right surface. Thus, when the positioning portion is formed by using the first component or the second component of the mold, the positioning portion cannot be removed from the first component or the second component of the mold. Accordingly, in order to form the positioning portion, a third component of the mold on the right side is required. As described above, for the optical module described in Japanese Unexamined Patent Application Publication No. 2013-137465, many components of the mold are required. This leads to a problem in that the fabrication cost increases.

SUMMARY

Technical Problem

Accordingly, an object of the present disclosure is to provide a connector and a connector set that can be fabricated by using a mold including a smaller number of components.

Solution to Problem

According to a first embodiment of the present disclosure, a connector set includes a first connector and a second connector that are to be coupled to each other. The first connector includes a first positioning surface that is, when the first connector and the second connector are coupled to each other, parallel to a first direction extending in a direction directed from the first connector toward the second connector and that is, when the first connector and the second connector are coupled to each other, parallel to a second direction perpendicular to the first direction. The first connector also includes a second positioning surface spaced from the first positioning surface by a distance that is in a third direction perpendicular to the first direction and the second direction and that reduces from the first connector side toward the second connector side in the first direction. The second connector includes a first positioning portion in contact with the first positioning surface when the first connector and the second connector are coupled to each other and a second positioning portion in contact with the second positioning surface when the first connector and the second connector are coupled to each other. None of normal vectors of a first surface of the second connector that faces one side in the second direction have a component directed toward another side opposite to the one side in the second direction. None of normal vectors of a second surface of the second connector that faces the other side in the second direction have a component directed toward the one side in the second direction. None of normal vectors of a third surface of the second connector that faces the first connector side in the first direction have a component in the second direction, or none of the normal vectors of the third surface have a component directed toward the one side in the second direction. The third surface of the second connector includes the first positioning portion and the second positioning portion.

According to a second embodiment of the present disclosure, a connector set includes a first connector and a second connector that are to be coupled to each other. The second connector includes a third positioning surface that is, when the first connector and the second connector are coupled to each other, parallel to a first direction extending in a direction directed from the first connector toward the second connector and that is, when the first connector and the second connector are coupled to each other, parallel to a second direction perpendicular to the first direction. The second connector also includes a fourth positioning surface spaced from the third positioning surface by a distance that is in a third direction perpendicular to the first direction and the second direction and that reduces from the second connector side toward the first connector side in the first direction. The first connector includes a third positioning portion in contact with the third positioning surface when the first connector and the second connector are coupled to each other and a fourth positioning portion in contact with the fourth positioning surface when the first connector and the second connector are coupled to each other. None of normal vectors of a first surface of the second connector that faces one side in the second direction have a component on another side opposite to the one side in the second direction. None of normal vectors of a second surface of the second connector that faces the other side in the second direction have a component on the one side in the second direction. In the second connector, none of normal vectors of a third surface that faces the first connector side in the first direction have a component in the second direction, or none of the normal vectors of the third surface have a component directed toward the one side in the second direction, and the third surface includes the third positioning surface and the fourth positioning surface.

According to the first embodiment of the present disclosure, a second connector to which a first connector is to be coupled includes a first positioning portion, when the first connector and the second connector are coupled to each other. A first positioning surface of the first connector that is parallel to a first direction extends in a direction from the first connector toward the second connector and is parallel to a second direction perpendicular to the first direction. The second connector also includes a second positioning portion, when the first connector and the second connector are coupled to each other. The second positioning surface of the first connector is spaced from the first positioning surface by a distance which is in a third direction perpendicular to the first direction and the second direction and which reduces in the first direction. None of normal vectors of a first surface that is positioned on one side in the second direction have a component directed toward another side opposite to the one side in the second direction. None of normal vectors of a second surface that faces the other side in the second direction have a component directed toward the one side in the second direction. None of normal vectors of a third surface that faces the first connector side in the first direction have a component in the second direction, or none of the normal vectors of the third surface have a component directed toward the one side in the second direction. The third surface includes the first positioning portion and the second positioning portion.

According to the second embodiment of the present disclosure, a second connector to which a first connector is to be coupled includes a third positioning surface that is, when the first connector and the second connector are coupled to each other, parallel to a first direction extending in a direction directed from the first connector toward the second connector, that is, when the first connector and the second connector are coupled to each other, parallel to a second direction perpendicular to the first direction, and that is, when the first connector and the second connector are coupled to each other, contacted by a third positioning portion of the first connector. The second connector also includes a fourth positioning surface that is spaced from a first positioning surface by a distance which is in a third direction perpendicular to the first direction and the second direction and which reduces from the first connector side toward the second connector side in the first direction and that is contacted by a fourth positioning portion of the first connector. None of normal vectors of a first surface that faces one side in the second direction have a component directed toward another side opposite to the one side in the second direction. None of normal vectors of a second surface that faces the other side in the second direction have a component directed toward the one side in the second direction. None of normal vectors of a third surface that is positioned on the first connector side in the first direction have a component in the second direction, or none of the normal vectors of the third surface have a component directed toward the one side in the second direction. The third surface includes the third positioning surface and the fourth positioning surface.

Advantageous Effects of Disclosure

According to the present disclosure, the connector can be fabricated by using the mold including a smaller number of the components.

BRIEF DESCRIPTION OF THE DRAWINGS

FIG. 8A is a perspective view of the appearance of a receptacle 22a.

FIG. 8B is a perspective view of the appearance of the receptacle 22a.

DETAILED DESCRIPTION

A Structure of an Optical Transmission Module

Figure 1A:
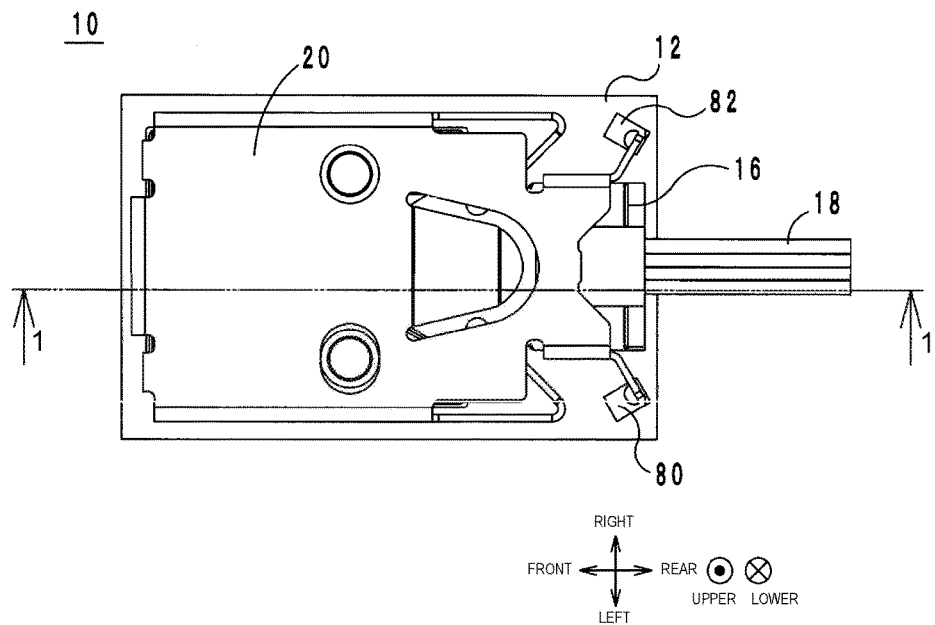
FIG. 1A illustrates a plan view of an optical transmission module 10 seen from above.
Figure 1B:
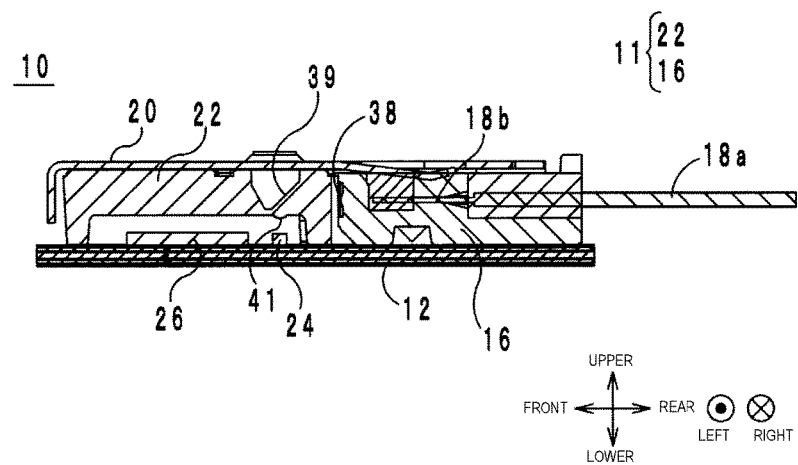
FIG. 1B is a sectional structural view taken along line 1-1 illustrated in FIG. 1A.
Figure 2:
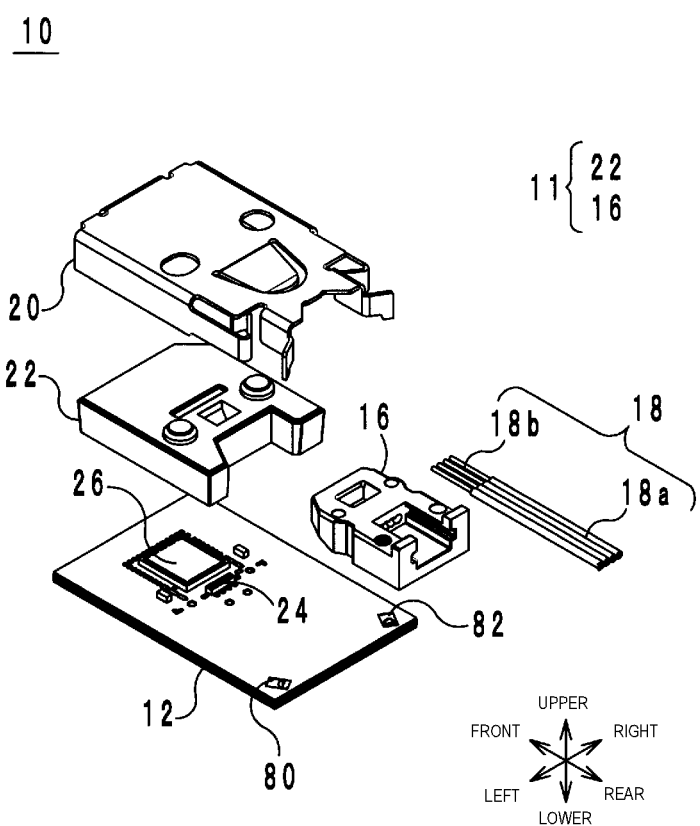
FIG. 2 is an exploded perspective view of the optical transmission module 10.

A structure of an optical transmission module according to an embodiment will be described below with reference to the drawings. FIG. 1A is a plan view of an optical transmission module 10 seen from above. FIG. 1B is a sectional structural view taken along line 1-1 illustrated in FIG. 1A. FIG. 2 is an exploded perspective view of the optical transmission module 10. Hereafter, the direction of a normal to a main surface of a circuit board 12 of the optical transmission module 10 is defined as a vertical direction serving as a second direction. Furthermore, in the optical transmission module 10, a direction extending in a direction in which a first connector that is a plug 16 is coupled to a second connector that is a receptacle 22 is defined as a front-rear direction serving as a first direction. A direction from the plug 16 toward the receptacle 22 is defined as a front direction. The vertical direction and the front-rear direction are perpendicular to each other. Furthermore, a direction perpendicular to the vertical direction and the front-rear direction is a lateral direction serving as a third direction. The receptacle 22 and the plug 16 of the optical transmission module 10 are arranged in the first direction. It should be understood that the definitions of the direction are exemplary.

As illustrated in FIGS. 1A, 1B, and 2, the optical transmission module 10 is provided with the circuit board 12, the plug 16 (connector), an optical fiber 18, a metal cap 20, the receptacle 22 (connector), a light receiving element array (photo-electric converter) 24, and a drive circuit 26. Hereafter, the plug 16 and the receptacle 22 are included in a connector set 11.

The circuit board 12 is a plate-shaped member formed of BT (bismaleimide-triazine) resin, ceramic, or the like. As illustrated in FIG. 1A, the circuit board 12 has a rectangular shape in plan view when seen from above. Hereafter, a main surface positioned on the upper side of the circuit board 12 is referred to as a top surface, and a main surface positioned on the lower side of the circuit board 12 is referred to as a bottom surface. Surface mount electrodes (not illustrated) are provided on the bottom surface of the circuit board 12. The surface mount electrodes are to be electrically coupled to lands of a mother board when the optical transmission module 10 is mounted on the mother board.

Ground electrodes 80 and 82 are respectively provided near a right rear corner and near a left rear corner of the top surface of the circuit board 12. The potentials of the ground electrodes 80 and 82 are maintained at a ground potential.

The light receiving element array 24 is mounted on the circuit board 12 near the center of the top surface of the circuit board 12. The light receiving element array 24 includes a plurality of (four according to the present embodiment) photodiodes that convert optical signals into electrical signals. The four photodiodes are arranged in a row along a straight line extending in the lateral direction.

The drive circuit 26 is mounted on the top surface of the circuit board 12. According to the present embodiment, the drive circuit 26 is disposed in front of the light receiving element array 24. The drive circuit 26 includes a semiconductor circuit element that drives the light receiving element array 24. The drive circuit 26 and the circuit board 12 are coupled to each other through wiring lines and wires disposed on or in the circuit board 12. The wires are formed of Au.

Figure 3A:
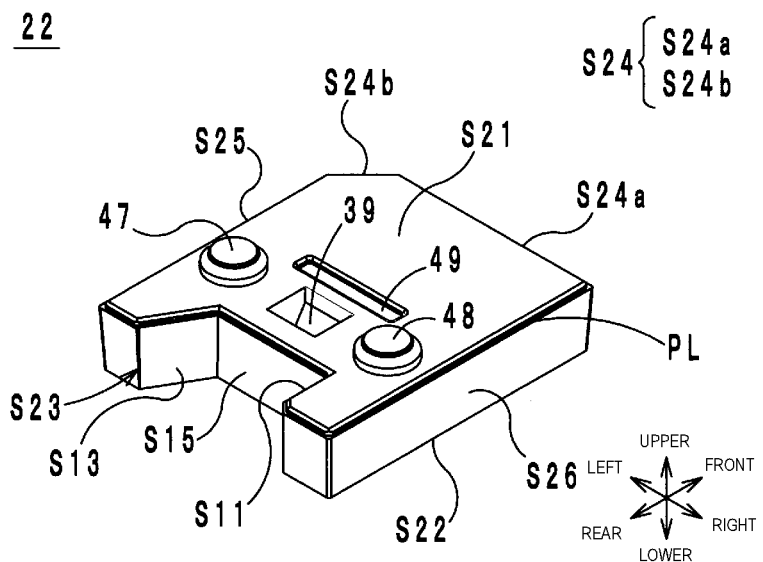
FIG. 3A is a perspective view of the appearance of a receptacle 22.
Figure 3B:
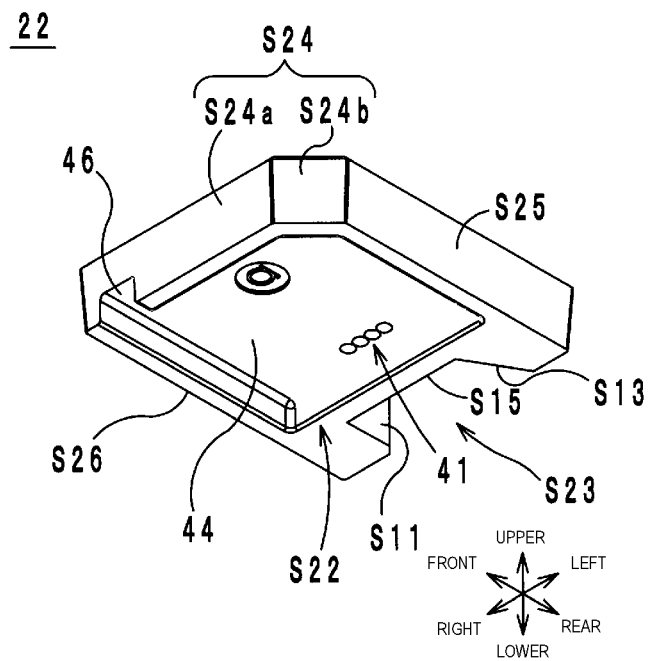
FIG. 3B is a perspective view of the appearance of the receptacle 22.

Next, the receptacle 22 is described with reference to the drawings. FIGS. 3A and 3B are perspective views of the appearance of the receptacle 22.

As illustrated in FIGS. 3A and 3B, the receptacle 22 having a box shape is formed of transparent resin member. The material of the receptacle 22 is, for example, an epoxy-based resin having light transparency. The receptacle 22 includes an upper surface S21 serving as a first surface, a lower surface S22 serving as a second surface, a rear surface S23 serving as a third surface, a front surface S24 serving as a fourth surface, a left surface S25 serving as a fifth surface, and a right surface S26 serving as a sixth surface. The upper surface S21 (first surface) is a top surface of the receptacle 22 that faces upward in the vertical direction. The lower surface S22 (second surface) faces the circuit board 12 when the receptacle 22 is attached onto the circuit board 12.

The receptacle 22 includes positioning surfaces S11 and S13, a light input/output surface S15, a total reflection surface 39, and a lens array 41. The positioning surfaces S11 and S13 are formed in the rear surface 23 by a cut that penetrates through in the vertical direction and has a projecting shape projecting from the rear direction toward the front direction of the rear surface S23 in plan view.

The positioning surface S11 of the receptacle 22 includes a sliding surface and a restraining surface. The sliding surface allows the plug 16 to slide parallel to a direction in which optical signals transmitted between the plug and the receptacle 22 travel. The restraining surface restrains relative displacement of the plug 16 and the receptacle 22 in a direction perpendicular to the optical signal traveling direction. For example, a flat surface that is parallel to the front-rear direction and the vertical direction. The normal vector of the positioning surface S11 is directed in the left direction that is directed from the inside toward the outside of the receptacle 22 and perpendicular to a surface. The distance between the positioning surface S13 and the positioning surface S11 reduces toward the front direction. The normal vector of the positioning surface S13 is directed toward the rear left direction. The light input/output surface S15 is a flat surface disposed between the positioning surface S11 and the positioning surface S13 in the lateral direction. The light input/output surface S15 is positioned in front of the positioning surfaces S11 and S13. The normal vector of the light input/output surface S15 is directed rearward. The positioning surfaces S11 and S13 are directly connected to both the upper surface S21 and the lower surface S22. Thus, when seen from above, the cut having a trapezoidal shape is provided at a rear edge of the receptacle 22 in plan view.

Furthermore, all the normal vectors of parts of the rear surface S23 other than the positioning surfaces S11 and S13 are directed rearward. Accordingly, at least, none of the normal vectors of the rear surface S23 have an upward component. Preferably, none of the normal vectors of the rear surface S23 have an upward component or a downward component, and all the normal vectors of the rear surface S23 are parallel to a flat plane that is parallel to the front-rear direction and the lateral direction.

The total reflection surface 39 is included in the upper surface S21 and is a flat surface formed by a recessed part of the upper surface S21. The total reflection surface 39 is positioned behind the positioning surface S13. The normal vector of the total reflection surface 39 is directed toward the upper front direction and inclined by 45° relative to a plane that is parallel to the front-rear direction and the lateral direction.

Furthermore, the upper surface S21 further includes projections 47 and 48 and a recess 49. The projections 47 and 48 are spaced from the total reflection surface 39 and respectively positioned to the left and right of the total reflection surface 39. The projections 47 and 48 each have a cylindrical shape or a frusto-conical shape that projects upward. The projections 47 and 48 have diameters that allow the projections 47 and 48 to be respectively fitted into inner diameters of holes 66 and 68. The diameters of the frusto-conical projections 47 and 48 reduce toward the upper side. Accordingly, none of the normal vectors of the outer circumferential surfaces of the projections 47 and 48 have a downward component.

The recess 49 is a linear groove extending in the lateral direction and positioned in front of the total reflection surface. None of the normal vectors of the inner peripheral surface of the recess 49 have a downward component.

Furthermore, all the normal vectors of part of the upper surface S21 other than the total reflection surface 39, the projections 47 and 48, and the recess 49 are directed upward. Accordingly, none of the normal vectors of the upper surface S21 have a downward component.

Furthermore, the lower surface S22 has a recess 44. The recess 44 is formed by an upward recess in part of the lower surface S22 other than the outer edges. However, a cut 46 is provided on a front edge of the lower surface S22. The recess 44 communicates with the outside through the cut 46. The normal vectors of neither inner peripheral surfaces of the recess 44 nor the cut 46 have an upward component.

The lens array 41 is included in the lower surface S22 and positioned right below the total reflection surface 39 in the inner peripheral surface of the recess 44. The lens array 41 is formed by downwardly projecting parts of the lower surface S22 so as to have convex shapes. The lens array 41 includes laterally arranged four convex lenses. None of the normal vectors of the outer circumferential surfaces of the lens array 41 have an upward component.

Furthermore, all the normal vectors of part of the lower surface S22 other than the lens array 41, the recess 44, and the cut 46 are directed downward. Accordingly, none of the normal vectors of the lower surface S22 have an upward component.

The front surface S24 includes two flat surfaces S24a and S24b. The flat surface S24a is a rectangular flat surface that extends in the lateral direction. All the normal vectors of the flat surface S24a are directed forward. Accordingly, none of the normal vectors of the flat surface S24a have an upward component or a downward component. In addition, all the normal vectors of the flat surface S24a are parallel to a horizontal plane that is parallel to the front-rear direction and the lateral direction. The flat surface S24b is a rectangular flat surface connected to a left end of the flat surface S24a. All the normal vectors of the flat surface S24b are directed toward the front left direction. Accordingly, none of the normal vectors of the flat surface S24b have an upward component or a downward component. In addition, all the normal vectors of the flat surface S24b are parallel to a horizontal plane that is parallel to the front-rear direction and the lateral direction. Thus, none of the normal vectors of the front surface S24 have an upward component or a downward component. In addition, all the normal vectors of the front surface S24 are parallel to a flat plane that is parallel to the front-rear direction and the lateral direction.

The left surface S25 is a rectangular flat surface that extends in the front-rear direction. All the normal vectors of the left surface S25 are directed leftward. Accordingly, none of the normal vectors of the left surface S25 have an upward component or a downward component. In addition, all the normal vectors of the left surface S25 are parallel to a plane that is parallel to the front-rear direction and the lateral direction.

The right surface S26 is a rectangular flat surface that extends in the front-rear direction. All the normal vectors of the right surface S26 are directed rightward. Accordingly, none of the normal vectors of the right surface S26 have an upward component or a downward component. In addition, all the normal vectors of the right surface S26 are parallel to a horizontal plane that is parallel to the front-rear direction and the lateral direction.

Furthermore, as will be described later, the receptacle 22 is a resin member formed by using an upper half T1 of a mold and a lower half T2 of the mold to be mated with a first half T1 of the mold in the vertical direction. In order to mate both the halves of the mold to each other, the upper half T1 is subjected to a pressure applied downward from above, and the lower half T2 is subjected to a pressure applied upward from below. Thus, the upper half T1 and the lower half T2 of the mold are mated with each other. Accordingly, a parting line PL is formed in the receptacle 22 by a boundary where the two halves are mated. The parting line PL is a boundary where, when the receptacle 22 is formed by transferring to the resin the shape of an inner space formed by mating a plurality of components of the mold to one another, the plurality of components of the mold are mated with one another. Projecting burrs and steps may be formed in the boundary due to misalignment of mating surfaces. As illustrated in FIG. 3A, the parting line PL is provided at a boundary between the upper surface S21 and the rear surface S23, the front surface S24, the left surface S25, and the right surface S26. Out of a plurality of parting line regions formed by surrounding and dividing the surface of the receptacle 22 with the parting line PL, the positioning surfaces S11 and S13 and the lens array 41 are provided within a single parting line region. Specifically, the positioning surfaces S11 and S13 and the lens array 41 are positioned below the parting line PL. The shapes of the positioning surfaces S11 and S13 and the lens array 41 are formed by transferring the shape of the lower half T2 of the mold.

The receptacle 22 as described above is, as illustrated in FIGS. 1B and 2, to be attached onto the top surface of the circuit board 12 where the light receiving element array 24 is mounted. In more detail, the receptacle 22 is to be attached onto the circuit board 12 with the adhesive so that the light receiving element array 24 and the drive circuit 26 are disposed within a space formed by the inner peripheral surface of the recess 44 and the top surface of the circuit board 12. In so doing, the receptacle 22 is positioned so that focal points of the lenses of the lens array 41 are positioned on light receiving surfaces of the photodiodes of the light receiving element array 24.

Figure 4A:
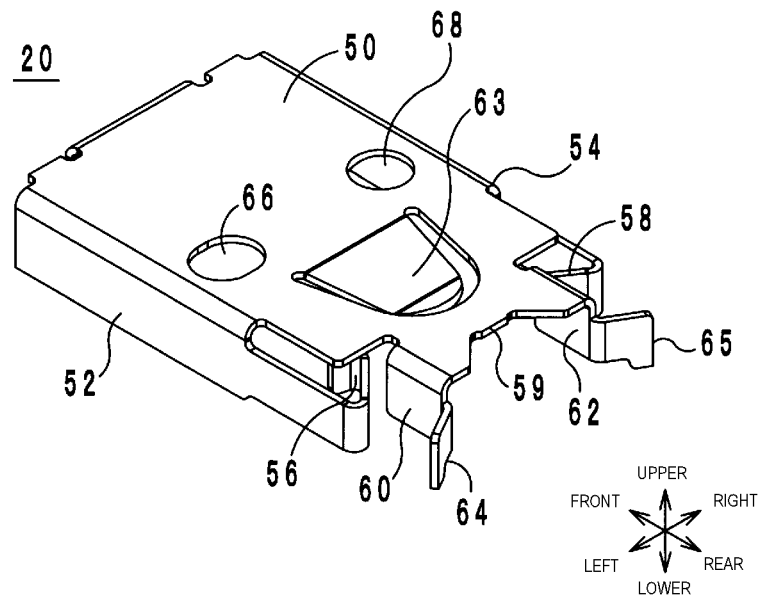
FIG. 4A is a perspective view of the appearance of a metal cap 20.
Figure 4B:
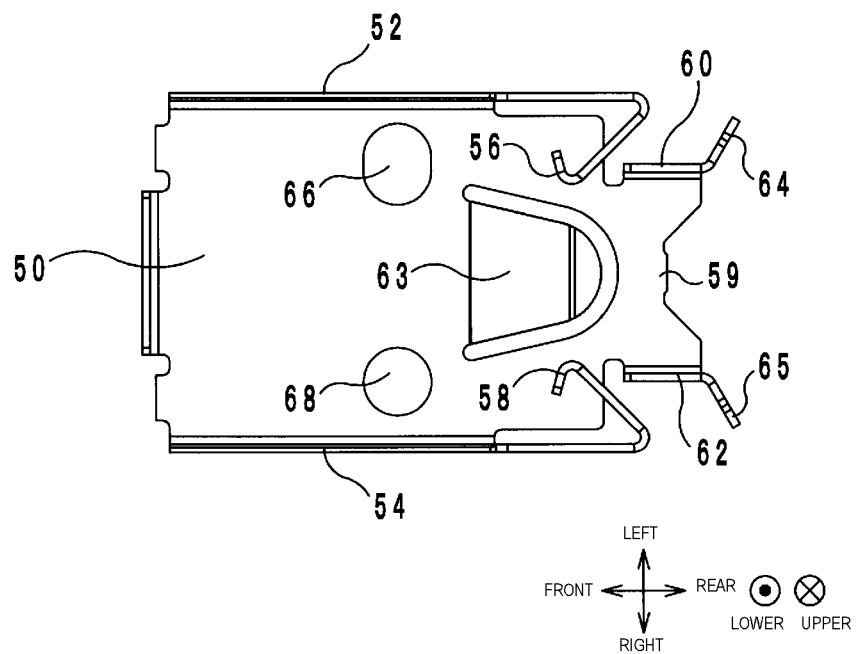
FIG. 4B is a bottom view of the metal cap 20.

Next, the metal cap 20 is described with reference to the drawings. FIGS. 4A and 4B are bottom views of the metal cap 20.

The metal cap 20 is fabricated by bending a single metal sheet (for example, SUS301). The metal cap 20 includes an upper surface 50, a lower surface 51, a left surface 52, a right surface 54, engaging portions 56 and 58, holding surfaces 59, 60, and 62, and connecting portions 64 and 65. The upper surface 50 has a rectangular shape. The left surface 52 has a rectangular shape and is bent downward from a left edge of the upper surface 50. The right surface 54 has a rectangular shape and is bent downward from a right edge of the upper surface 50. Thus, the upper surface 50, the left surface 52, and the right surface 54 orthogonally projected from the front direction form a square-cornered U shape that is open at the bottom.

Furthermore, the upper surface 50 has an engaging piece 63 and the holes 66 and 68. The engaging piece 63 is a metal piece formed by forming a U-shaped slit in the upper surface 50. The engaging piece 63 is slightly bent downward from the upper surface 50.

The hole 66 has an elliptical shape and is provided to the left front relative to the engaging piece 63. A longitudinal direction in which a parallel portion of the hole 66 extends is parallel to the lateral direction. The hole 68 has a circular shape provided to the right front relative to the engaging piece 63.

The engaging portion 56 extends rearward from a rear end of the left surface 52, and then, is bent toward the right front direction. Furthermore, an end portion of the engaging portion 56 in the right front direction is bent leftward.

The engaging portion 58 extends rearward from a rear end of the right surface 54, and then, is bent toward the left front direction. Furthermore, an end portion of the engaging portion 58 in the left front direction is bent rightward.

The holding surface 59 projects rearward from a rear edge of the upper surface 50 and has a rectangular shape. The holding surface 60 is bent downward from a left edge of the holding surface 59. The holding surface 62 is bent downward from a right edge of the holding surface 59. Thus, the holding surfaces 59, 60, and 62 form, in plan view seen from the front direction, a square-cornered U shape that is open at the bottom. However, the distance between the holding surface 60 and the holding surface 62 is smaller than the distance between the left surface 52 and the right surface 54.

The connecting portion 64 is connected to a rear edge of the holding surface 60 and extends toward the left rear direction. The connecting portion 65 is connected to a rear edge of the holding surface 62 and extends toward the right rear direction.

The metal cap 20 having the structure as described above is attached onto the top surface of the circuit board 12 so as to cover the receptacle 22. Specifically, the projections 47 and 48 are respectively inserted into the holes 66 and 68. Thus, the upper surface 50 is brought into contact with the upper surface S21, the left surface 52 is brought into contact with the left surface S25, and the right surface 54 is brought into contact with the right surface S26. Furthermore, the positioning surface S11 and the positioning surface S13 are positioned between the holding surface 60 and the holding surface 62 in plan view seen from the rear direction.

Lower ends of the left surface 52 and the right surface 54 are secured to the top surface of the circuit board 12 with solder, an adhesive, or the like. Furthermore, the connecting portions 64 and 65 are respectively secured to the ground electrodes 80 and 82 by being joined to solder, an adhesive, or the like.

Figure 5:
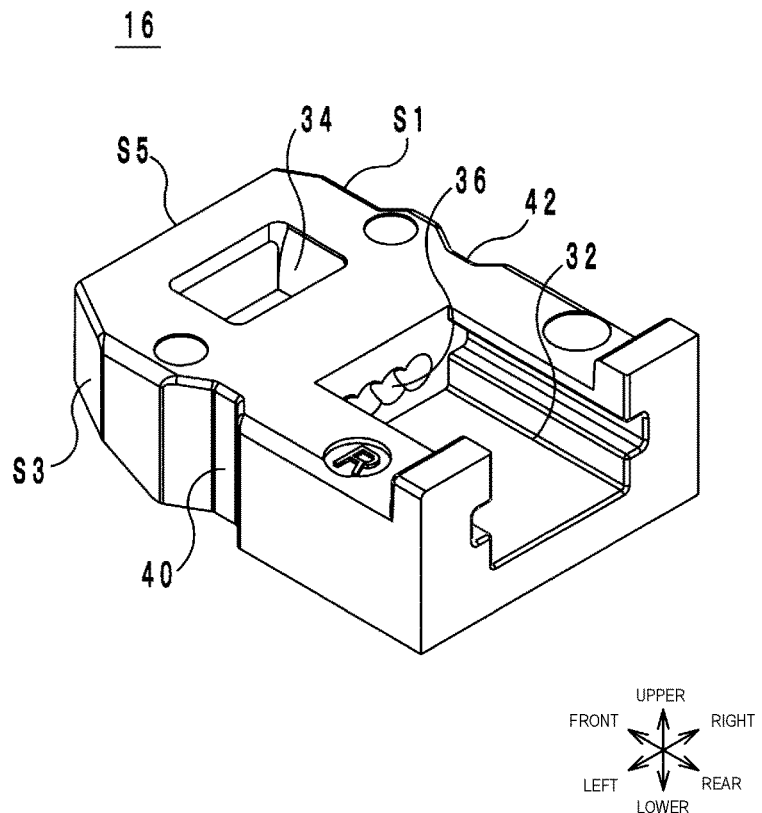
FIG. 5 is a perspective view of the appearance of a plug 16.
Figure 6A:
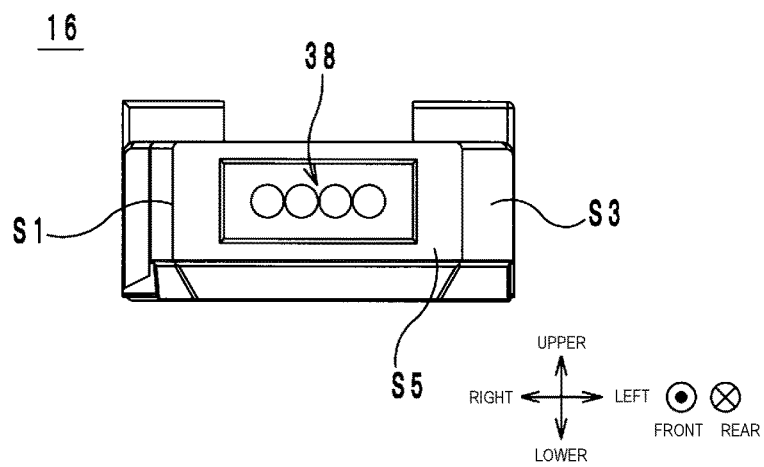
FIG. 6A is a front view of the plug 16 orthogonally projected from the front direction.
Figure 6B:
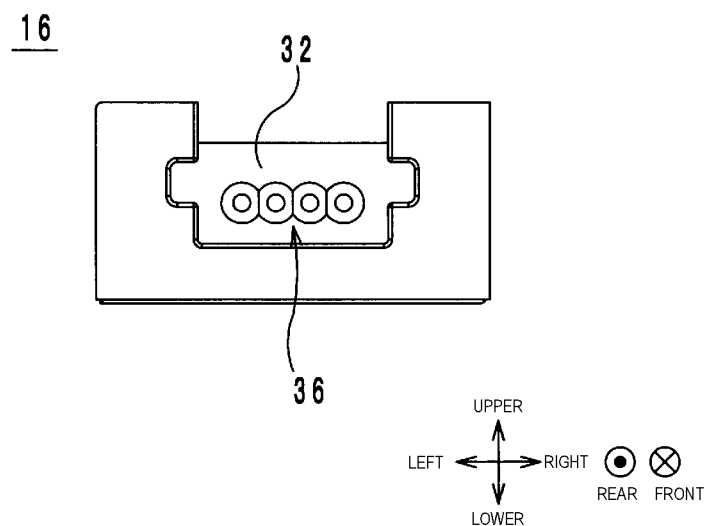
FIG. 6B illustrates the plug 16 orthogonally projected from the rear direction.

Next, the plug 16 and the optical fiber 18 are described with reference to the drawings. FIG. 5 is a perspective view of the appearance of the plug 16. FIG. 6A illustrates the plug 16 orthogonally projected from the front direction. FIG. 6B illustrates the plug 16 orthogonally projected from the rear direction.

As illustrated in FIGS. 5, 6A, and 6B, the plug 16 having a box shape is formed of transparent resin member. The plug 16 may be formed of, for example, polyetherimide resin or cycloolefin polymer resin.

The plug 16 includes positioning surfaces S1 and S3, a light input/output surface S5, and a lens array 38. The positioning surface S1 is a flat surface parallel to the front-rear direction and the vertical direction. The positioning surface S1 occupies a region near a front end of a right surface of the plug 16. The normal vector of the positioning surface S1 is directed rightward. Furthermore, the positioning surface S1 is substantially parallel to the positioning surface S11 when the plug 16 and the receptacle 22 are coupled to each other. The distance between the positioning surface S3 and the positioning surface S1 reduces toward the front direction. The positioning surface S3 occupies a region near a front end of a left surface of the plug 16. The normal vector of the positioning surface S3 is directed toward the front left direction. Furthermore, the positioning surface S3 is substantially parallel to the positioning surface S13 when the plug 16 and the receptacle 22 are coupled to each other. The light input/output surface S5 is a flat surface disposed between the positioning surface S1 and the positioning surface S3 in the lateral direction. The light input/output surface S5 is positioned in front of the positioning surfaces S1 and S3. The light input/output surface S5 is a front surface of the plug 16. The normal vector of the light input/output surface S5 is directed rearward. Furthermore, the light input/output surface S5 is substantially parallel to the light input/output surface S15 when the plug 16 and the receptacle 22 are coupled to each other.

The lens array 38 is provided on the front surface of the plug 16. The lens array 38 is formed by projecting parts of the front surface of the plug 16 so as to have convex shapes. The lens array 38 includes laterally arranged four convex lenses.

A recess 40 is provided in the left surface of the plug 16. A recess 42 is provided in the right surface of the plug 16.

Furthermore, recesses 32 and 34 are provided in an upper surface of the plug 16. The recess 34 is provided near a front edge of the upper surface of the plug 16 and has a rectangular shape in plan view when seen from above. The recess is positioned behind the recess 34 and has a rectangular shape in plan view when seen from above. Furthermore, the recess 34 extends to a rear surface of the plug 16. Accordingly, there is a cut in part of the rear surface of the plug 16.

Furthermore, the plug 16 has a plurality of (four according to the present embodiment) holes 36 that allow the recess 32 and the recess 34 to communicate with each other. The four holes 36 orthogonally projected from the rear direction are each superposed on a corresponding one of the four lenses of the lens array 38.

The optical fiber 18 includes four core wires and jackets that cover the four core wires. The core wires include cores and claddings formed of resin such as fluorine based resin. Furthermore, the jackets are formed of resin such as polyethylene based resin. As illustrated in FIG. 1B, the jackets are removed from part of the optical fiber 18 near a distal end of the optical fiber 18, so that the core wires are exposed. Hereafter, portions where the core wires are exposed are referred to as exposed portions 18b. Furthermore, portions where the core wires are covered with the jackets are referred to as covered portions 18a.

The four exposed portions 18b are each inserted into a corresponding one of the four holes 36 from the rear direction. The distal ends of the four exposed portions 18b are positioned right behind the four lenses of the lens array 38 in the recess 34, respectively. At this time, the optical axes of optical signals traveling from distal end surfaces of the four exposed portions 18b (core wires) are parallel to the front-rear direction.

Furthermore, resin having transparency is poured into the recesses 32 and 34. In more detail, the recesses 32 and 35 are physically optically coupled to the optical fiber 18 through transparent acrylic resin or the like. Thus, the optical fiber 18 is secured to the plug 16. That is, the plug 16 is provided at the distal end of the optical fiber 18.

The plug 16 structured as described above is coupled to the receptacle 22. Specifically, the plug 16 is inserted from the rear direction into a space surrounded by the holding surfaces 59, 60, and 62 and the circuit board 12. When the plug 16 is moved forward, the positioning surface S3 of the plug 16 is brought into contact with the positioning surface S13 of the receptacle 22. The plug 16 moved further forward in this state is displaced rightward along the positioning surface S13. Then, when the positioning surface S1 of the plug 16 is brought into contact with the positioning surface S11 of the receptacle 22, the rightward displacement of the plug 16 is restrained. The forward and rightward movement of the plug 16 is stopped. This determines the positions of the plug 16 and the receptacle 22 relative to each other in the lateral direction. The positioning surfaces S1 and S11 serve as reference surfaces for the relative positions of the plug 16 and the receptacle 22 in the lateral direction. Then, the engaging portions 56 and 58 of the metal cap 20 are respectively brought into engagement with the recesses 40 and 42 of the plug 16, and the connecting portion 64 of the metal cap 20 is brought into engagement with the recess disposed in an intermediate portion of the plug 16 in the front-rear direction. Thus, the plug 16 is secured to the receptacle 22.

Here, when the plug 16 and the receptacle 22 are coupled to each other, the distal ends of the four core wires of the optical fiber 18 arranged in the lateral direction to form a flat shape extending parallel to the vertical direction and the lateral direction are respectively optically coupled to the light receiving surfaces of the four photodiodes of the light receiving element array 24 arranged in the lateral direction on the top surface of the circuit board 12. Specifically, a plurality of optical signals radiated from the distal ends of the four core wires of the optical fiber 18 travel forward and are incident upon the lens array 38. The lens array 38 collimates the optical signals which are in the form of laser beams, so that the optical signals become more similar to parallel light. After that, the optical signals enter the plug 16 through the light input/output surface S15.

The total reflection surface 39 that changes the traveling direction of the optical signals and extends in the lateral direction is provided in front of the light input/output surface S15 with a certain distance therebetween. Specifically, the optical signals having traveled forward are reflected by the total reflection surface 39 so as to be redirected downward, thereby being incident upon the lens array 41. The lens array 41 concentrates the laser beams that form the respective optical signals onto the light receiving element array 24. As a result, the light receiving element array 24 receives the optical signals and generates electrical signals. As has been described, when the plug 16 and the receptacle 22 are coupled to each other, the total reflection surface 39 performs the function of optically coupling the distal ends of the core wires of the optical fiber 18 and the light receiving element array 24 to one another. Furthermore, when the plug 16 and the receptacle 22 are coupled to each other, the lens array 41 is provided between the total reflection surface 39 and the light receiving element array 24 and performs the function of concentrating the laser beams onto the light receiving surfaces of the light receiving element array 24. Here, a light emitting element array may be used instead of the light receiving element array 24. In this case, optical signals radiated from a plurality of light emitting element arrays of the board pass through the lens array 41 and are incident upon the optical fiber 18.

About a Method of Fabricating the Receptacle 22

Figure 7:
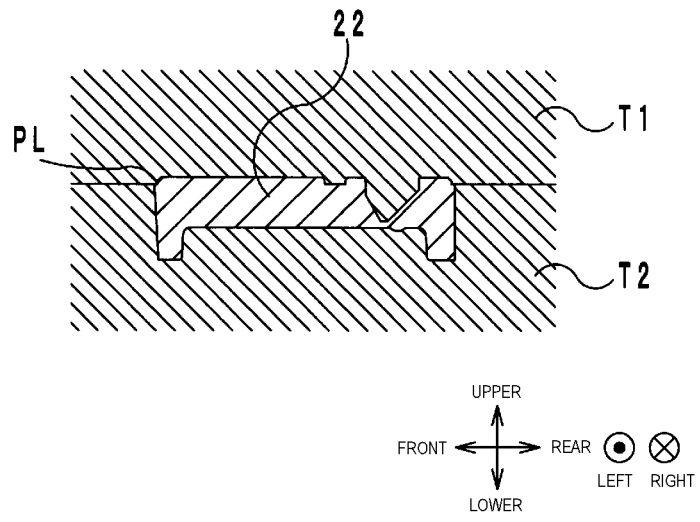
FIG. 7 is a sectional structural view of the receptacle 22 during fabrication.

Next, a method of fabricating the receptacle 22 is described with reference to the drawings. FIG. 7 is a sectional structural view of the receptacle 22 during fabrication of the receptacle. FIG. 7 illustrates the sectional structure of the receptacle 22 taken along line 1-1 illustrated in FIG. 1.

As illustrated in FIG. 7, the receptacle 22 is formed by injecting resin into a space formed by two halves of the mold, that is, the upper half T1 serving as a first half of the mold and the lower half T2 serving as a second half of the mold. Specifically, the upper half T1 is used to form a portion of the receptacle 22 on the upper side relative to the parting line PL (that is, the upper surface S21). The lower half T2 is used to form a portion of the receptacle 22 on the lower side relative to the parting line PL (that is, the lower surface S22, the rear surface S23, the left surface S25, and the right surface S26).

While the upper half T1 is subjected to a pressure applied downward from above and the lower half T2 is subjected to a pressure applied upward from below, the resin is supplied into an inner space of the mold formed by the upper half T1 and the lower half T2. As a result, the shape of the upper surface S21 including the total reflection surface 39 is formed by transferring the shape of the upper half T1. The shape of the lower surface S22 including the lens array 41, the rear surface S23 including the positioning surfaces S11 and S13, and the flowability of the resin supplied into the mold can be controlled through temperature change or chemical change. The shapes of the left surface S25 and the right surface S26 are formed by transferring the shape of the lower half T2. By performing the above-described steps, the receptacle 22 is completed. It is noted that a flowability of the resin supplied into the inner space of the mold can be controlled through temperature change or chemical change. In order to fabricate the resin members, a fabrication method such as injection molding, transfer forming, or compression molding can be used.

Next, the receptacle 22 is attached onto the circuit board 12. Specifically, a photo-curing adhesive, a UV curing adhesive in more detail, is applied to the top surface of the circuit board 12. Next, the receptacle 22 is attached onto the top surface of the circuit board 12 so as to cover the light receiving element array 24 and the drive circuit 26. After that, ultra-violet light is radiated to cure the adhesive.

Next, the metal cap 20 is attached onto the top surface of the circuit board 12 so as to cover the receptacle 22. Specifically, a thermosetting adhesive such as epoxy based resin is applied to the top surface of the circuit board 12. Furthermore, conductive paste such as Ag is applied to the ground electrodes 80 and 82 of the circuit board 12. Next, the metal cap 20 is attached onto the top surface of the circuit board 12. After that, heat is applied to the circuit board 12 by using an oven to cure the adhesive and the conductive paste. Thus, the metal cap 20 is secured to the circuit board 12.

The plug 16 is fabricated by injection molding using a mold similarly to the receptacle 22. However, since a method of fabricating the plug 16 is generally known, description of the method is omitted.

Effects

According to the receptacle 22 of the present embodiment, the receptacle 22 can be fabricated by using a mold including a smaller number of components. In more detail, none of the normal vectors of the upper surface S21 have a downward component, and none of the normal vectors of the lower surface S22 have an upward component. Accordingly, the upper surface S21 can be formed by using the upper half T1, and the lower surface S22 can be formed by using the lower half T2.

Here, the rear surface S23 of the receptacle 22 including the positioning surfaces S11 and S13 is a flat surface that does not have a deformed portion in the lateral direction perpendicular to a mating direction of the upper and lower halves of the mold when separating from the parting line PL. Or, the rear surface S23 of the receptacle 22 is normally tapered, that is, inclined inward toward the direction separating from the parting line PL in the lateral direction. Preferably, none of the normal vectors of the rear surface S23 have an upward component or a downward component. That is, in the case where the rear surface S23 is formed by using the lower half T2, when the receptacle 22 is removed from the lower half T2, the rear surface S23 has no irregularities or a reverse taper that is caught by the lower half T2. Thus, for the connector set 11, a separate component of the mold other than the upper half T1 and the lower half T2 is not required to form the rear surface S23 of the receptacle 22. As a result, the receptacle 22 can be fabricated by using a mold including a smaller number of components.

Furthermore, in the receptacle 22, none of the normal vectors of the front surface S24 have an upward component or a downward component, none of the normal vectors of the left surface S25 have an upward component or a downward component, and none of the normal vectors of the right surface S26 have an upward component or a downward component. Thus, in the case where the front surface S24, the left surface S25, and the right surface S26 are formed by using the lower half T2, when the receptacle 22 is removed from the lower half T2, none of the front surface S24, the left surface S25, or the right surface S26 has irregularities that are caught by the lower half T2. Thus, for the connector set 11, a separate component of the mold other than the half T1 and the half T2 of the mold is not required to form the front surface S24, the left surface S25, and the right surface S26 and the receptacle 22. As a result, the receptacle 22 can be fabricated only with the two halves of the mold, that is, the upper half T1 and the upper half T2.

Furthermore, with the receptacle 22, the occurrence of fabrication variation of positional relationships between the positioning surfaces S11 and S13 and the lens array 41 can be suppressed. In more detail, the positioning surfaces S11 and S13 and the lens array 41 are positioned below the parting line PL. That is, the shapes of the positioning surfaces S11 and S13 and the lens array 41 are formed by transferring the shape of the same lower half T2. Accordingly, even when there is misalignment in position between the upper half T1 and the lower half T2, no misalignment occurs in the positional relationships between the positioning surfaces S11 and S13 and the lens array 41. Accordingly, the distal ends of the core wires of the optical fiber 18 and the light receiving element array 24 can be optically coupled to each other with good accuracy.

The total reflection surface 39 is formed by using the upper half T1. Accordingly, there may be the occurrence of fabrication variation of the positional relationships between the total reflection surface 39 and the positioning surfaces S11 and S13 and between the total reflection surface 39 and the lens array 41. However, such fabrication variation does not significantly adversely affect the optical coupling between the distal ends of the core wires of the optical fiber 18 and the light receiving element array 24. In more detail, the total reflection surface 39 has, in plan view seen from above, a flat surface that uniformly extends in a direction perpendicular to the signal traveling direction and has a large size sufficient to surround the light receiving element array 24. The total reflection surface 39 has, when orthogonally projected from the front side, a flat surface that uniformly extends in a direction perpendicular to the signal traveling direction and has a large size sufficient to surround the distal ends of the core wires of the optical fiber 18. Accordingly, even when the position of the total reflection surface 39 is deviated in the front-rear direction or the lateral direction, the optical coupling between the distal ends of the core wires of the optical fiber 18 and the light receiving element array 24 is maintained as long as the above-described surrounding relationships are not lost.

Furthermore, with the receptacle 22, the occurrence of fabrication variation of the positional relationships between the positioning surfaces S11 and S13 and the lens array 41 can be suppressed also for the following reason. In more detail, the positioning surfaces S11 and S13 are directly connected to the lower surface S22. Thus, the positioning surfaces S11 and S13 and the lower surface S22 can be formed by using the lower half T2. That is, the shapes of the positioning surfaces S11 and S13 and the lower surface S22 can be formed by transferring the shape of the same lower half T2. Accordingly, the occurrence of fabrication variation of the positional relationships between the positioning surfaces S11 and S13 and the lens array 41 can be suppressed.

Furthermore, with the receptacle 22, the plug 16 and the receptacle 22 can be positioned with good accuracy. In more detail, the positioning surface S1 is substantially parallel to the positioning surface S11 when the plug 16 and the receptacle are coupled to each other. The positioning surface S2 is substantially parallel to the positioning surface S13 when the plug 16 and the receptacle 22 are coupled to each other. Accordingly, the positioning surface S1 and the positioning surface S11 are brought into surface contact with each other, and the positioning surface S2 and the positioning surface S13 are brought into surface contact with each other. Thus, when the plug 16 and the receptacle 22 are coupled to each other, the occurrence of play between the plug 16 and the receptacle 22 is suppressed. Accordingly, with the receptacle 22, the plug 16 and the receptacle 22 can be positioned with good accuracy.

Furthermore, with the receptacle 22, removal of the receptacle 22 from the circuit board 12 is suppressed. In more detail, in order to attach the receptacle 22 onto the top surface of the circuit board 12, the adhesive is supplied between the lower surface S22 of the receptacle 22 and the circuit board 12 and heated to be cured. In so doing, air in the space surrounded by the inner peripheral surface of the recess 44 of the receptacle 22 and the top surface of the circuit board 12 is heated and expands. Accordingly, the pressure in the space increases. Thus, a force to remove the receptacle 22 from the circuit board 12 is applied. Accordingly, the cut 46 that is a through hole allowing communication between the recess 44 and the outside is provided in the receptacle 22. Due to the presence of this cut 46, the increase in pressure in the space is suppressed. As a result, removal of the receptacle 22 from the circuit board 12 is suppressed.

Furthermore, with the receptacle 22, breakage of Au wires coupling the drive circuit 26 and circuit board 12 to each other during thermal shock testing is suppressed. In more detail, in an optical transmission module using a typical receptacle, a circuit board and a drive circuit are coupled to each other through Au wires. Furthermore, the drive circuit is covered and sealed with, for example, epoxy based resin having transparency. Since the circuit board, the Au wires, the epoxy based resin, and the drive circuit are made of different materials, these elements have different coefficients of linear expansion. For this reason, in an optical transmission module using a related-art receptacle, the Au wires may break due to a load applied to the Au wires during thermal shock testing.

In contrast, in the optical transmission module 10, the drive circuit 26 is not sealed with resin. Specifically, the Au wires are disposed in a space formed by a recess of the receptacle 22. Accordingly, in the optical transmission module 10, compared to a typical optical transmission module in which the Au wires are sealed with resin, a thermal stress load applied during thermal shock testing to the Au wires (not illustrated) coupling the drive circuit 26 and the circuit board to each other is small. As a result, in the optical transmission module 10, breakage of the Au wires coupling the drive circuit 26 and the circuit board 12 to each other during thermal shock testing is suppressed.

Furthermore, with the optical transmission module 10, the structure of the receptacle 22 can be simplified. In more detail, in the optical transmission module 10, a guide surface for the plug 16 is formed by the holding surfaces 59, 60, and 62 of the metal cap 20. Accordingly, it is not required that the receptacle 22 be provided with a rail that guides insertion/removal movements of the plug 16. As a result, the structure of the receptacle 22 is simplified.

Furthermore, in the optical transmission module 10, easy removal of the plug 16 from the receptacle 22 is suppressed. In more detail, in the optical transmission module 10, the engaging portions 56 and 58 are respectively engaged with the recesses 40 and 42. During coupling of the plug 16 and the receptacle 22 to each other, a right end and a left end of the engaging portions 56 and 58 are respectively pressed by a left surface and a right surface of the plug 16, thereby the engaging portions 56 and 58 are elastically deformed into warped shapes. Then, when the right end and the left end of the engaging portions 56 and 58 respectively reach the recesses 40 and 42, the states of the engaging portions 56 and 58 return back to the original states, and the engaging portions 56 and 58 are brought into engagement with the recesses 40 and 42.

Here, since the engaging portions 56 and 58 are comparatively long, the engaging portions 56 and 58 can be largely elastically deformed. For this reason, even when the amount of rightward projection of the engaging portion 56 and the amount of leftward projection of the engaging portion 58 are increased, the engaging portions 56 and 58 can be sufficiently elastically deformed into warped shapes during coupling of the plug 16 and the receptacle 22 to each other. Thus, the depth of the recesses 40 and 42 of the plug 16 can be increased. Accordingly, the engaging portions 56 and 58 can be more firmly engaged with the recesses 40 and 42. As a result, easy removal of the plug 16 from the receptacle 22 is suppressed.

Furthermore, in the optical transmission module 10, plastic deformation of the metal cap 20 is suppressed. In more detail, the connecting portions 64 and 65 are respectively connected to the rear edges of the holding surfaces 60 and 62 and secured to the ground electrodes 80 and 82 of the circuit board 12. Accordingly, when the plug 16 and the receptacle 22 are coupled to each other, excessively large deformation of the holding surfaces 60 and 62 due to contact with the plug 16 is suppressed by the connecting portions 64 and 65. As a result, plastic deformation of the metal cap 20 is suppressed.

Furthermore, in the optical transmission module 10, removal of the metal cap 20 from the circuit board 12 is suppressed. In more detail, the engaging piece 63 is in pressure contact with the surface on the upper side of the plug 16. When the plug 16 is secured to the receptacle 22 only with such an engaging piece 63, it is required that the engaging piece 63 be in pressure contact with the plug 16 with a large force. In this case, however, a large force is applied between the circuit board 12 and the metal cap 20. This may lead to removal of the metal cap 20 from the circuit board 12.

Accordingly, in the optical transmission module 10, the plug 16 is interposed between the engaging portions 56 and 58 on the left and right sides so as to be held in the receptacle 22. This holding with the engaging portions 56 and 58 does not apply a large force between the circuit board 12 and the metal cap 20. As a result, removal of the metal cap 20 from the circuit board 12 is suppressed.

Furthermore, the metal cap 20 having lower ends that are kept aligned can be easily mounted on the circuit board 12 in the optical transmission module 10.

A Receptacle According to a First Variant

Figure 8A:
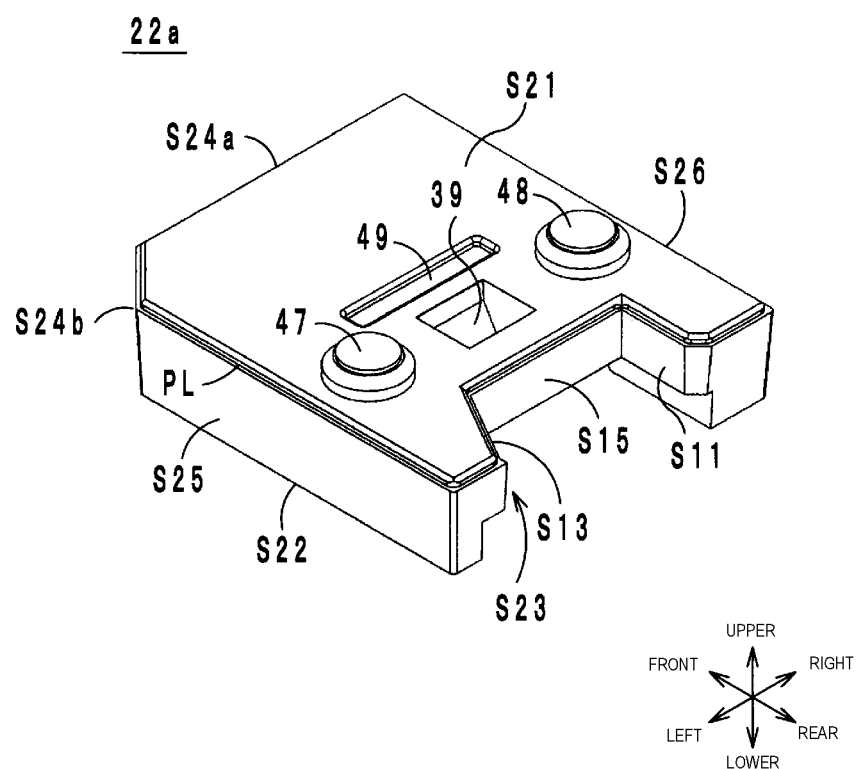
Figure 8B:
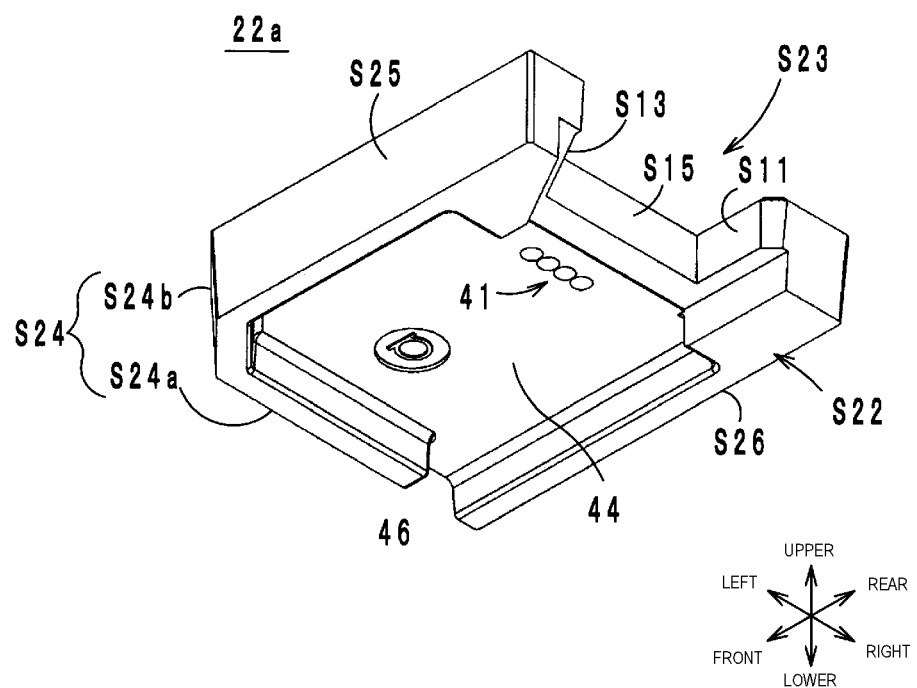

Hereafter, a receptacle 22a according to a first variant is described with reference to the drawings. FIGS. 8A and 8B are perspective views of the appearance of the receptacle 22a.

The structures of the positioning surfaces S11 and S13 and the light input/output surface S15 of the receptacle 22a are different from those of the receptacle 22. The following description of the receptacle 22a is mainly made for these differences.

The positioning surfaces S11 and S13 and the light input/output surface S15 of the receptacle 22 are in contact with the lower surface S22. That is, the positioning surfaces S11 and S13, the light input/output surface S15, and the lower surface S22 connect the upper surface S21 and the lower surface S22 to each other.

In contrast, the positioning surfaces S11 and S13 and the light input/output surface S15 of the receptacle 22a are not in contact with the lower surface S22. Thus, a gap is formed between the top surface of the circuit board 12 and the positioning surfaces S11, the positioning surface S13, and the light input/output surface S15 when the receptacle 22a is attached onto the top surface of the circuit board 12. As a result, during mounting of the receptacle 22a on the circuit board 12, solder is contained in the gap between the top surface of the circuit board 12 and the positioning surface S11, the positioning surface S13, and the light input/output surface S15. This suppresses adhering of the solder to the positioning surfaces S11 and S13 and the light input/output surface S15. As a result, misalignment in positioning of the receptacle 22a and the plug 16 due to the solder is suppressed.

A Receptacle According to a Second Variant

Figure 9A:
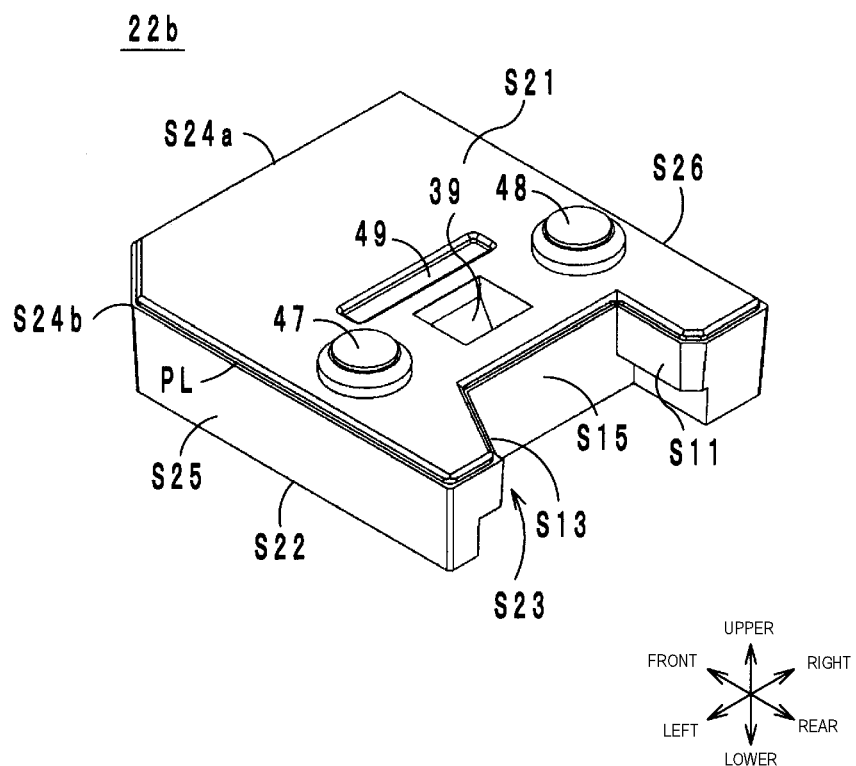
FIG. 9A is a perspective view of the appearance of a receptacle 22b.
Figure 9B:
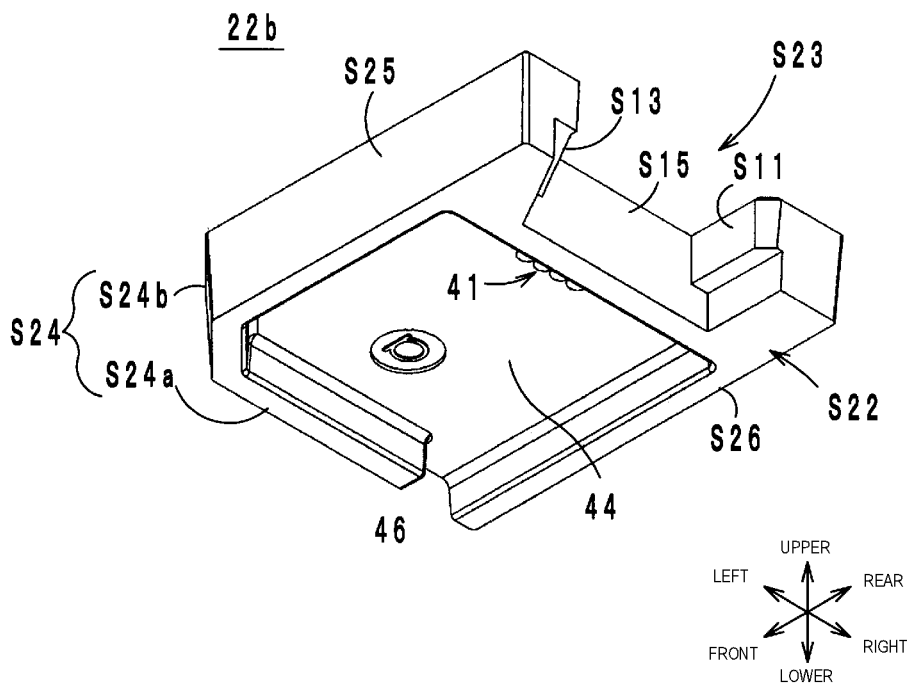
FIG. 9B is a perspective view of the appearance of the receptacle 22b.

Hereafter, a receptacle 22b according to a second variant is described with reference to the drawings. FIGS. 9A and 9B are perspective views of the appearance of the receptacle 22b.

The structure of the light input/output surface S15 of the receptacle 22b is different from that of the receptacle 22a. The following description of the receptacle 22b is mainly made for this difference.

When positioning the receptacle 22b and the plug 16 to each other, prevention of adhering of the solder to the positioning surfaces S11 and S13 is more important than adhering of the solder to the light input/output surface S15. Accordingly, in the receptacle 22b, the positioning surfaces S11 and S13 are not in contact with the lower surface S22, and the light input/output surface S15 is in contact with the lower surface S22. With the receptacle 22b as described above, misalignment in positioning of the receptacle 22b and the plug 16 due to the solder is suppressed as is the case with the receptacle 22a.

An Optical Transmission Module According to a Variant

Figure 10:
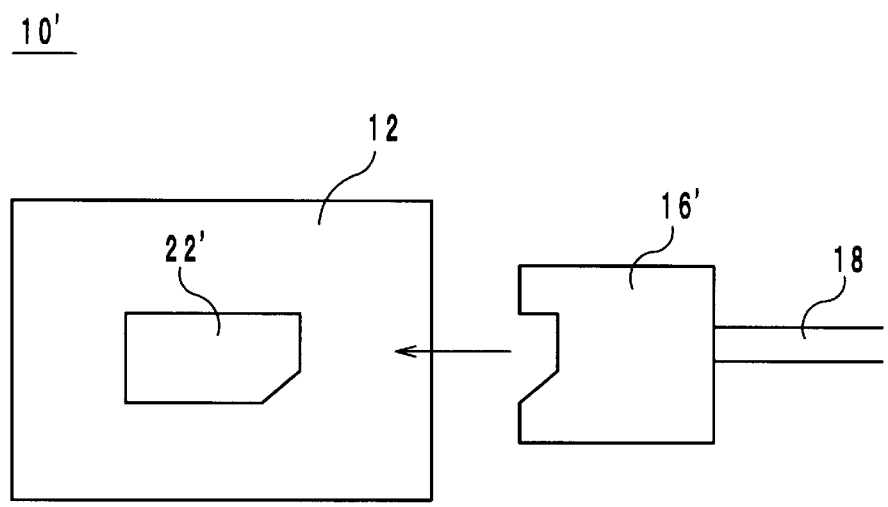
FIG. 10 is a structural view of an optical transmission module 10'.

Hereafter, an optical transmission module 10' according to a variant is described with reference to the drawing. FIG. 10 is a structural view of the optical transmission module 10'.

The structures of a plug 16' and a receptacle 22' of the optical transmission module 10' are different from the corresponding structures of the optical transmission module 10. In more detail, the plug 16' has the structure of the receptacle 22, and the receptacle 22' has the structure of the plug 16.

The structures of the receptacle and the plug may be interchanged as described above.

A method of fabricating the plug 16' is the same as the method of fabricating the receptacle 22.

Other Embodiments

The optical transmission module, the receptacle, the plug, the connector set, and the method of fabricating the receptacle according to the present disclosure are not limited to the optical transmission module, the receptacle, the plug, the connector set, and the method of fabricating the receptacle according to the above-described embodiments and can be changed within the scope of the gist of the present disclosure.

The lens array 41 and parts of the positioning surfaces S11 and S13 may be positioned below the parting line PL. In this case, the lens array 41 and the parts of the positioning surfaces S11 and S13 are formed by using the half T2 of the mold. However, as illustrated in FIG. 3A, it is preferable that the lens array 41, the entirety of the positioning surface S11, and the entirety of the positioning surface S13 be positioned below the parting line PL.

The normal vectors of each of the front surface S24, the left surface S25, and the right surface S26 may include both of a normal vector having an upward component and a normal vector having a downward component.

Furthermore, the positioning surfaces S1, S2, S11, and S12 may be curved surfaces instead of flat surfaces.

Furthermore, as long as the positioning surfaces S11 and S13 are surfaces, for example, positioning portions such as projections may be used instead of the positioning surfaces S1 and S3. Furthermore, as long as the positioning surfaces S1 and S3 are surfaces, for example, positioning portions such as projections may be used instead of the positioning surfaces S11 and S13.

Furthermore, it is sufficient that none of the normal vectors of the rear surface S23 have an upward component, or none of the normal vectors of the rear surface S23 have a downward component.

INDUSTRIAL APPLICABILITY

As has been described, the present disclosure is useful for the connector and the connector set. In particular, the present disclosure is excellent for fabricating the connector with a smaller number of components of the mold.

The invention claimed is:

1. A connector set comprising:
a first connector and a second connector that are to be coupled to each other,
wherein the first connector includes
a first positioning surface that is, when the first connector and the second connector are coupled to each other, parallel to a first direction extending in a direction directed from the first connector toward the second connector and that is, when the first connector and the second connector are coupled to each other, parallel to a second direction perpendicular to the first direction, and
a second positioning surface spaced from the first positioning surface by a distance that is in a third direction perpendicular to the first direction and the second direction and that reduces from a side of the first connector toward a side of the second connector in the first direction,
wherein the second connector includes
a first positioning portion in contact with the first positioning surface when the first connector and the second connector are coupled to each other, and
a second positioning portion in contact with the second positioning surface when the first connector and the second connector are coupled to each other,
wherein none of normal vectors of a first surface of the second connector that faces one side in the second direction have a component directed toward another side opposite to the one side in the second direction,
wherein none of normal vectors of a second surface of the second connector that faces the other side in the second direction have a component directed toward the one side in the second direction,
wherein none of normal vectors of a third surface of the second connector that faces the first connector side in the first direction have a component in the second direction, or none of the normal vectors of the third surface have a component directed toward the one side in the second direction,
wherein the third surface of the second connector includes the first positioning portion and the second positioning portion,
wherein the second surface of the second connector faces the circuit board,
wherein, when the first connector and the second connector are coupled to each other, the first positioning portion is a surface that is parallel to the first positioning surface and that is not in direct contact with the second surface, and
wherein, when the first connector and the second connector are coupled to each other, the second positioning portion is a surface that is parallel to the second positioning surface and that is not in direct contact with the second surface.

2. The connector set according to claim 1,
wherein the first positioning portion is a surface that is parallel to the first positioning surface when the first connector and the second connector are coupled to each other, and
wherein the second positioning portion is a surface that is parallel to the second positioning surface when the first connector and the second connector are coupled to each other.

3. The connector set according to claim 1,
wherein the first connector is a plug provided at a distal end of an optical fiber, and
wherein the second connector is a receptacle.

4. The connector set according to claim 3,
wherein the first direction is parallel to a direction in which an optical axis extends at the distal end of the optical fiber.

5. The connector set according to claim 3,
wherein the receptacle is attached onto a circuit board where a photo-electric conversion element is mounted, and
wherein the receptacle further includes a total reflection surface that optically couples the distal end of the optical fiber and the photo-electric conversion element to each other when the plug and the receptacle are coupled to each other.

6. The connector set according to claim 5,
wherein the second surface of the receptacle faces the circuit board,
wherein, when the first connector and the second connector are coupled to each other, the first positioning portion is a surface that is parallel to the first positioning surface and that is not in contact with the second surface, and wherein, when the first connector and the second connector are coupled to each other, the second positioning portion is a surface that is parallel to the second positioning surface and that is not in contact with the second surface.

7. The connector set according to claim 6,
wherein the receptacle further includes a lens that is provided between the total reflection surface and the photo-electric conversion element and that has a focal point positioned on the photo-electric conversion element.

8. The connector set according to claim 7,
wherein the second surface includes the lens, and wherein the first positioning portion and the second positioning portion are directly connected to the second surface.

9. The connector set according to claim 8,
wherein the receptacle is a resin member formed by using a first half of a mold and a second half of the mold to be mated with the first half of the mold in the second direction, and
wherein at least part of the first positioning portion, at least part of the second positioning portion, and the lens are positioned on the other side in the second direction relative to a parting line formed at a boundary between the first half of the mold and the second half of the mold.

10. The connector set according to claim 9,
wherein the first positioning portion, the second positioning portion, and the lens are positioned on the other side in the second direction relative to the parting line.

11. The connector set according to claim 1,
wherein the second connector is a plug provided at a distal end of an optical fiber, and the first connector is a receptacle.

12. The connector set according to claim 1,
wherein none of normal vectors of a fourth surface of the second connector that faces the first connector side in the first direction have a component in the second direction, or none of the normal vectors of the fourth surface have a component on the one side in the second direction,
wherein none of normal vectors of a fifth surface of the second connector that is positioned on one of sides in the third direction have a component in the second direction, or none of the normal vectors of the fifth surface have a component on the one side in the second direction, and
wherein none of normal vectors of a sixth surface of the second connector that is positioned on another side in the third direction have a component in the second direction, or none of the normal vectors of the sixth surface have a component on the one side in the second direction.

13. A connector set comprising:
a first connector and a second connector that are to be coupled to each other,
wherein the second connector includes
a first positioning surface that is, when the first connector and the second connector are coupled to each other, parallel to a first direction extending in a direction directed from the first connector toward the second connector and that is, when the first connector and the second connector are coupled to each other, parallel to a second direction perpendicular to the first direction, and
a second positioning surface spaced from the first positioning surface by a distance that is in a third direction perpendicular to the first direction and the second direction and that reduces from the second connector side toward the first connector side in the first direction,
wherein the first connector includes
a first positioning portion in contact with the first positioning surface when the first connector and the second connector are coupled to each other, and
a second positioning portion in contact with the second positioning surface when the first connector and the second connector are coupled to each other,
wherein none of normal vectors of a first surface of the second connector that faces one side in the second direction have a component on another side opposite to the one side in the second direction,
wherein none of normal vectors of a second surface of the second connector that faces the other side in the second direction have a component on the one side in the second direction,
wherein, in the second connector, none of normal vectors of a third surface that faces the first connector side in the first direction have a component in the second direction, or none of the normal vectors of the third surface have a component directed toward the one side in the second direction, and
wherein the third surface includes the first positioning surface and the second positioning surface,
wherein the second surface of the second connector faces the circuit board,
wherein, when the first connector and the second connector are coupled to each other, the first positioning portion is a surface that is parallel to the first positioning surface and that is not in direct contact with the second surface, and
wherein, when the first connector and the second connector are coupled to each other, the second positioning portion is a surface that is parallel to the second positioning surface and that is not in direct contact with the second surface.

14. A second connector to which a first connector is to be coupled, the second connector comprising:
a first positioning portion in contact with, when the first connector and the second connector are coupled to each other, a first positioning surface of the first connector that is parallel to a first direction extending in a direction directed from the first connector toward the second connector and that is parallel to a second direction perpendicular to the first direction, and
a second positioning portion in contact with, when the first connector and the second connector are coupled to each other, the second positioning surface of the first connector that is spaced from the first positioning surface by a distance which is in a third direction perpendicular to the first direction and the second direction and which reduces in the first direction,
wherein none of normal vectors of a first surface that is positioned on one side in the second direction have a component directed toward another side opposite to the one side in the second direction, wherein none of normal vectors of a second surface that faces the other side in the second direction have a component directed toward the one side in the second direction, wherein none of normal vectors of a third surface that faces the first connector side in the first direction have a component in the second direction, or none of the normal vectors of the third surface have a component directed toward the one side in the second direction, and wherein the third surface includes the first positioning portion and the second positioning portion, wherein the second surface of the second connector faces the circuit board, wherein, when the first connector and the second connector are coupled to each other, the first positioning portion is a surface that is parallel to the first positioning surface and that is not in direct contact with the second surface, and wherein, when the first connector and the second connector are coupled to each other, the second positioning portion is a surface that is parallel to the second positioning surface and that is not in direct contact with the second surface.

15. A second connector to which a first connector is to be coupled, the second connector comprising:

a first positioning surface that is, when the first connector and the second connector are coupled to each other, parallel to a first direction extending in a direction directed from the first connector toward the second connector, that is, when the first connector and the second connector are coupled to each other, parallel to a second direction perpendicular to the first direction, and that is, when the first connector and the second connector are coupled to each other, contacted by a first positioning portion of the first connector, a second positioning surface that is spaced from the first positioning surface by a distance which is in a third direction perpendicular to the first direction and the second direction and which reduces from the first connector side toward the second connector side in the first direction and that is contacted by a second positioning portion of the first connector, wherein none of normal vectors of a first surface that faces one side in the second direction have a component directed toward another side opposite to the one side in the second direction, wherein none of normal vectors of a second surface that faces the other side in the second direction have a component directed toward the one side in the second direction, wherein none of normal vectors of a third surface that is positioned on the first connector side in the first direction have a component in the second direction, or none of the normal vectors of the third surface have a component directed toward the one side in the second direction, and wherein the third surface includes the first positioning surface and the second positioning surface, wherein the second surface of the second connector faces the circuit board, wherein, when the first connector and the second connector are coupled to each other, the first positioning portion is a surface that is parallel to the first positioning surface and that is not in direct contact with the second surface, and wherein, when the first connector and the second connector are coupled to each other, the second positioning portion is a surface that is parallel to the second positioning surface and that is not in direct contact with the second surface.

\* \* \* \* \*